Patented Apr. 24, 1934

1,956,530

UNITED STATES PATENT OFFICE 1,956,530

COLD RESINIFICATION OF PHENOL ALCOHOLS

Frederic S. Granger, Elizabeth, N. J., assignor to Combustion Utilities Corporation, New York, N. Y., a corporation of Maine No Drawing. Application December 27, 1930, Serial No. 505,208

8 Claims. (Cl. 260—4)

The present invention relates to synthetic resins of the phenol formaldehyde type, and more especially it relates to the controlled production, from phenol alcohols and mixtures containing high percentages of phenol alcohols, of various resinous products, some of which are admirably adapted for use in molding compositions and others of which have utility in the manufacture of coating compositions.

It has been well known for a long time that resins could be produced by the conversion of phenol alcohols by means of heat. Furthermore, investigators have been well aware of the extreme sensitiveness of phenol alcohols towards acids whereby in the process of producing phenol alcohols, the injudicious use of acid frequently caused formation of undesirable amorphous products. The well-known resinous dehydration products of phenol alcohols known as "saliretins" have always been prepared, both for technical and scientific purposes, by the application of heat with or without the use of condensing agents.

The present invention is based on the discovery that valuable resins may be produced by the addition of a sufficiently strong inorganic or organic acid or its equivalent to a phenol alcohol or mixtures thereof, preferably in aqueous solution, without the application of heat,—or the addition of such an acid to the neutral aqueous solution of such primary condensation products as are obtained by the alkaline condensation of phenols with aldehydes,—and that the resins thus prepared have certain advantageous properties not normally found in resins of this type prepared in the usual manner from phenols, as for example, by the formaldehyde treatment of phenol, in the presence of an alkaline catalyst.

Among the more important objects of the present invention are to produce directly from phenol alcohols or mixtures containing the same, certain synthetic resins having curing properties equal or superior to those of resins prepared directly from the phenols or from phenol alcohols by the usual alkaline condensation methods; to provide for the direct production from phenol alcohols at or near atmospheric temperature of resinous condensation products of the Resitol form; to provide in an improved manner for the controlled manufacture from phenolic mixtures such as technical cresol,—of high-grade, light-colored, highly curable resins; to provide in an improved manner for separating from a mixture of phenolic substances those constituents having the property of forming colored compounds during and subsequent to the condensation reaction; and to provide a novel method for removing from a mixture of the higher tar acids of a coal tar oil or distillate those substances which tend to produce colored compounds during and subsequent to the resinification process. These and other objects will be apparent from the following description of the invention.

In its broadest scope, the invention resides in the treatment with formaldehyde or its equivalent such as paraform, hexa, and the like of phenolic substances such as phenol, meta-cresol, para-cresol and other phenols, phenol homologues, and phenol derivatives, or mixture of these products, with or without hydrocarbons such as coal tar neutral oil. Such a mixture is reacted in a manner hereinafter described, under conditions to transform a substantial portion at least and preferably a major portion of the phenolic substances named into phenol alcohols. This step desirably is carried out in the presence of an alkaline catalyst according to the well-known methods for making phenol alcohols.

When phenol itself is processed in this manner, the resultant phenol alcohols remain in solution in the reaction mixture, even after it is neutralized with a suitable acid such as hydrochloric acid which occurs as the next succeeding step in the process. During the formation of the phenol alcohols, especially if made by heating with a small quantity of alkali, a small amount of resin may be formed. Upon sufficient dilution with water, it will precipitate as an oily liquid, carrying with it any coloring matter which may be present. Thus, after removal of this resin for instance by filtration or decantation, a colorless, aqueous solution of phenol alcohols is obtained. If the process is so controlled that no resin is formed, then any coloring material present remains in the aqueous solution of the phenol alcohols and will produce some discoloration in the final product. In either case, a strong acid such as concentrated hydrochloric acid is then added to the aqueous solution in amount sufficient to render the same strongly acid. The insoluble resinous product thus formed is thereafter permitted to settle out. In form this resinous product varies from a flaky, white or pink solid, to a clear liquid, depending upon the concentration of acid catalyst in the mixture employed, smaller amounts of acid tending to give a liquid product which, however, solidifies upon standing. The solid form of product is composed principally of resins having the properties of Bakelite B, being insoluble in solvents such as acetone, but capable of being swelled by the latter, and becoming transiently sufficiently plastic on heating to be moldable by the well-known methods but readily curable by temperatures in the neighborhood of 100° C. and above. The liquid resinous product is soluble in acetone, but is also highly curable upon suitable heat treatment.

Other strong acids may be employed in connection with the present invention in place of hydrochloric acid. Sulfuric acid and phosphoric acid have been successfully employed for the purpose, as also has oxalic acid, although the last-named acid is much slower in its action, requiring several days for the completion of the resin precipitation as compared with hydrochloric acid, which produces precipitation after a few seconds. The time required for practical completion of the precipitation depends on the concentration of both the acid and of the phenol alcohols. When the concentrations of either or both of these substances are low, completion of the reaction may be hastened by moderate heating; but care must be exercised in heating, to avoid curing of the product so as to render it useless for molding. It is therefore preferred to allow the reaction to complete itself without heating, or at least to heat the mixture to temperatures not over 60° C. although temperatures as high as 100° C. may be employed if suitable precautions are taken to prevent the condensation from proceeding to the point where the resin is in part cured.

One method of producing phenol alcohols suitable for use in the process comprises treating a phenol or mixture of phenolic substances with from one to three or more molecular equivalents of formaldehyde, preferably in the presence of an alkaline catalyst. In the case of phenol itself, the employment of equal molecular proportions of phenol and formaldehyde tends to produce the phenol mono-alcohols, whereas larger amounts of formaldehyde facilitate the formation of the phenol dialcohols and polyalcohols. Where a relatively large amount of an alkaline catalyst is employed, the reaction is preferably permitted to proceed at normal atmospheric temperature for one or more days for the formation of phenol alcohols. Since following this step the alkaline mixture is neutralized with a suitable acid such as hydrochloric acid, which neutralization results in a loss of a considerable quantity of alkali, it is preferred to form the phenol alcohols very quickly by heating a mixture of phenol, aldehyde, and a very small quantity of alkali,—such as for example .05 of a mol of caustic soda,—for a short period of time, preferably ranging in the case of phenol, from 10 to 30 minutes or more,—following which a relatively small quantity of acid is needed for neutralization, and the time required for the operation is greatly reduced.

It is generally desirable to dilute the reaction mixture containing the phenol alcohol with a liquid solvent therefor prior to the neutralization thereof, not only for the purpose of facilitating separation from the phenol alcohols of any resin present therein but also for reducing the possibility of overheating the same during the succeeding steps of acid treatment, which might cause local curing of some of the resins formed from the phenol alcohols.

To the mixture of phenol alcohols, prepared in the above or any other known manner, either in the cold or hot state, a sufficient quantity of hydrochloric acid or other strong acid is added, to catalyze the extremely rapid resinification reaction of the phenol alcohols. The mixture is thoroughly agitated during such addition of acid; a precipitate rapidly forms and settles slowly. This resinous precipitate, as already indicated, may be in the form of a solid or of a liquid, depending upon whether a large quantity or a small quantity of acid was employed as a catalyst in the resinification stage of the process.

In the process of making phenol alcohols, as outlined above, and in general, from most phenols and formaldehyde, one molecule of phenol may combine with one or more than one molecule of formaldehyde resulting in the formation not only of mono alcohols but also of polyalcohols, namely dialcohols and in some cases, for instance from phenol or meta cresol, tri-alcohols. The relative quantities of these various alcohols formed may be controlled to some extent, by the proportion of formaldehyde employed and by the degree of prior dilution of the reaction mixture. Increasing the proportion of formaldehyde favors the formation of polyalcohols and if the proportion is theoretically sufficient to convert all of the phenol into the highest alcohol which it can form, this alcohol will be practically the sole product ultimately formed. If, however, a smaller proportion is used, there will result a mixture of the various phenol alcohols and free phenol. It is therefore impossible, with a phenol capable of forming one or more polyalcohols, to obtain exclusively monoalcohols, even when only one mole of formalin is employed per mole of phenol. Dilution of the reaction mixture, however, favors the formation of monoalcohols in preference to polyalcohols, and these two types of alcohols may be separated by means of suitable solvents, such as ether.

Applicant has now discovered that the resins made from the polyalcohols differ in certain respects from those made from the corresponding monoalcohols. For example, the former are usually superior in curing properties. A dialcohol of phenol, for instance, may be resinified in the presence of and in combination with a considerable quantity of free phenol and still give a highly curable resin, whereas with the monoalcohols this is not possible. The latter, under the same conditions yield very light colored novolaks, which also are technically desirable. Again, the polyalcohol resins are valuable in that they undergo little or no discoloration in the Bakelite A, B, or C state on exposure to air or light.

The present invention supplies a convenient means whereby advantage may be taken of these differences. The polyalcohols, when processed according to the present invention, yield resins which do not discolor even on curing by heat, which is not the case with resins made by alkaline resinification. The same is true of the monoalcohol resins, but they gradually discolor afterward on exposure to air and light. This discoloration may, however, be prevented by washing them, while in the B state, with a suitable solvent such as acetone.

The present invention utilizes the many advantages characteristic of acid resinification processes,—as distinguished from alkaline resinification processes,—without the attendant difficulties encountered in present acid resinification methods due to the highly exothermic reaction, difficult to control, and the necessary use of excessive quantities of formaldehyde without complete utilization thereof. Among other advantageous features are a relatively high speed of reaction,—and the formation of resins, from certain phenols, for example, phenol, meta cresol and even technical U. S. P. cresol, which are either precipitated originally in the B state or pass to the B state and no further in storage at room temperature without further processing. The advantage of having the resin in the B state, for molding,—long recognized in the art,—is that the resin is not forced out of the mold or distorted by excessive fluidity and evolution of gases at the molding temperatures.

Another advantageous feature, inherent in a process for manufacturing resin in the Bakelite B state, is the fact discovered by the applicant and mentioned above, that by soaking a B product in a suitable solvent such as acetone, alcohol, or ether and washing with such a solvent, a very light-colored or colorless jelly is obtained, which upon drying, yields a fluffy white or nearly white solid resin which can be molded at the usual curing temperature to a Bakelite C product with little or no discoloration during curing or thereafter.

Such a mixture of mono and polyalcohols of phenol may be treated in the cold with suitable solvents such as ether, which extracts the mono alcohols leaving the phenol poly-alcohols in the aqueous solution,—the latter of which may then be processed with acid in the manner described above.

The following specific embodiments of the invention are for the purpose of illustration only, and are not to be regarded as in any wise limiting the scope thereof:

Example 1

94 grams (1 mol) of phenol
100 cc. (1-1/3 mol) commercial formalin solution, and
400 cc. (1 mol) of 10% solution of caustic soda
are allowed to stand for two days for the formation of phenol alcohols and are then neutralized with dilute hydrochloric acid. Thereafter, 50 cc. concentrated hydrochloric acid are added to the mixture during agitation thereof, after which the mixture is permitted to stand. A precipitate rapidly forms and settles out as a flaky, white solid. A substantially smaller quantity of the concentrated acid will produce a precipitate of liquid nature which solidifies and changes slowly to the Bakelite B form on standing and until then is soluble in acetone but highly curable with heat. The solid form mentioned above is composed mainly of resins already having the properties of Bakelite B. These resins are separated from the reaction mixture by filtration or decantation, and are then washed with water until free from acid. They may then be molded and cured by well-known methods. The speed of the resinification reaction varies according to the amount and strength of the acid employed.

Example 2

94 grams (1 mol) phenol,
75 cc. (1 mol) formalin, and
50 cc. (.05 mol) of 4% solution of caustic soda
are mixed, forming a clear solution. This solution is heated at about 100° C. for 15 minutes, following which it is diluted with 750 cc. of cold water. It is then neutralized with dilute hydrochloric acid while agitating. After being permitted to stand for a sufficient time to permit any traces of resin formed in the first step of the process to settle out of the solution, the solution is then decanted or filtered, and the filtrate, containing the phenol alcohols, is strongly acidified with a strong acid such as sulfuric or hydrochloric acid preferably in the cold. A resinous product of the nature of that described in the first example is recovered.

A white, acetone-soluble resin may be produced by dissolving crystalline ortho-cresol-dialcohol in just sufficient water to dissolve it with agitation, following which an excess of hydrochloric acid is added. The resin precipitates in the form of a white granular solid which, after separation from the mother liquor and washing with water, is adapted to cure at the usual curing temperature.

Very satisfactory potentially reactive, curable resins have been produced with meta cresol as well as with technical cresol. These resins prepared in this manner by the cold acid condensation have the further advantage of being white or nearly so.

Example 3

A mixture of 10.8 grams technical U. S. P. cresol, containing about 50% meta cresol, 15.4 cc. formalin, and 20 cc. of 20% aqueous sodium hydroxide solution was allowed to stand overnight at room temperature. The odor of formaldehyde vanished entirely. It was then neutralized and diluted to 300 cc. with water. A quantity of brown liquid resin separated and after settling, was drawn off, leaving a clear nearly colorless aqueous solution of cresol alcohols. About 10 cc. of 38% hydrochloric acid were then added. A good yield of pale yellow gummy resin settled out and solidified. After allowing the mixture to stand for 48 hours, the acid water was decanted off and the resin was washed with water and allowed to dry at room temperature. It was partly insoluble in acetone but gelatinized thereby. A sample of this resin, heated at 120° C. for 15 minutes, was cured to the C state, without discoloration or swelling, yielding a very hard, tough, infusible product, unaffected by acetone and having the appearance of a creamy white enamel. Another sample was molded at 175° C. for 10 minutes yielding a well-formed, hard, resistant product having the color and appearance of a light maple wood. Neither showed the slightest discoloration after standing in the air and light for 48 days. Thus very satisfactory curable resins are made from technical cresol, by the practice of the present invention.

The tar acid mixtures found in the higher boiling range distillates of coal tar, and especially the higher boiling tar acids of low temperature coal tar, are known to yield phenol alcohols that are insoluble or sparingly soluble in water but are soluble in a mixture of alcohol and water in which the resins are nearly insoluble. Many attempts have been made in the past to produce light-colored or colorless potentially-reactive resins from these higher boiling range tar acids, such as those boiling at 210° C. and thereabove, but with little, if any, success. By the application of the present invention to these higher boiling range tar acids, it is possible to produce light colored resins of the potentially-reactive type which readily may be hardened by heating at temperatures below 100° C. At the same time those tar acid components which yield upon formaldehyde treatment dark-colored and less completely curable products are segregated in large measure from those of the potentially-reactive type, and may be recovered.

To illustrate this modification of the invention;
Example 4: The mixed tar acids obtained from a low temperature tar distillate having a boiling range up to 300° C. are dissolved in a solution of caustic soda and formalin in the proportion of 1 mol tar acid, 1 mol of caustic soda, and 1.3 mols of formaldehyde, and are allowed to stand for 2 days at room temperature to permit phenol alcohol formation. In this case considerable precipitation occurred during the period of standing. This precipitate contains water-insoluble sodium salts of phenol alcohols, diphenol methanes, and also certain resins produced by the reaction with formaldehyde of certain phenols which react very rapidly therewith, so that the phenol alcohols after their formation, resinify to a noticeable extent while other phenol alcohols are in process of formation. Certain of the higher phenols having a para side chain are among those that form phenol alcohols, whose sodium salts are but slightly soluble in water and consequently separate out from concentrated solutions, but may be held in solution by the presence of a sufficient quantity of other soluble phenolates or salts of the phenol alcohols. (In the case of the usual commercial mixtures of cresols, the salt of the para cresol alcohol does not precipitate as is also true of commercial cresylic acids distilling mainly in the xylenol range.) After mechanical separation of the dark precipitate, the solution of phenol alcohols is neutralized with acid, upon which an additional substantial amount of dark resinous material containing the insoluble phenol alcohols and free phenols, is precipitated in an amount materially less than that formed under alkaline conditions. After filtration of this precipitate, the remaining solution containing phenol alcohols was strongly acidified in the cold, upon which there precipitated a light yellow, highly curable resin which passed through the plastic stages and after hardening without discoloration at 95° C. was then infusible and very largely insoluble in and unaffected by acetone. Since it has been determined that in general among the mono-nuclear phenols, those whose alcohols or resins precipitate from alkaline solutions are also the ones which are characterized by the formation of resins of inferior curing properties, the above example illustrates a method for the separation of the tar acid mixture into portions, each of which has valuable resin-forming materials of substantially different nature, and which when mixed together tend to give products not well adapted for specific uses, but which when separated yield products having valuable properties adapting them for such uses.

The phenol alcohols insoluble, or nearly so, in water, which precipitate on neutralization may be separated and a solution thereof in a suitable solvent such as a mixture of alcohol and water may then be processed according to the present invention. The resinous precipitate is dissolved in ethyl alcohol, and water is then added thereto in sufficient quantity to precipitate the resin, which gradually settles out. The settling may be hastened by centrifuging or the like. The most efficient separation is obtained if the quantities of alcohol and water used are such that the resin separates in a gummy or tacky state. If it is liquid it will be contaminated with a large proportion of phenol alcohols. Most of the coloring material present is retained by the resin. Better results may be obtained by fractional precipitation with water. The aqueous alcoholic solution of phenol alcohols thus obtained, is strongly acidified in accordance with the present invention, yielding relatively light-colored, curable resins, which usually precipitate in liquid form and become solid or plastic on standing. The alcohol may be distilled off and recovered from the decanted solution, before the resinification is complete. Resins may in this way be precipitated in the Bakelite A state which are rapidly converted to the B state upon standing in the cold after evaporation of the solvent.

Where equimolecular portions of phenols in general and formaldehyde are employed there will frequently remain free phenolic substances in the phenol alcohol solution which apparently subsequently enter into the acid resinification reaction. The presence of free phenol may be avoided by employing larger proportions of formaldehyde in the stage of phenol alcohol production; or the phenol may be removed from the neutralized phenol alcohol solution by distillation before the acid resinification.

Whereas, in the usual process of making bakelite type resins, employing phenol-formaldehyde mixtures in the presence of a very small amount of basic catalyst at or near the boiling temperature of the mixture, a highly-colored resinous product normally forms during the heating—a curable, nearly colorless resin may be produced from these materials according to the practice of the present invention. Equal molecular proportions of commercial phenol and formaldehyde are heated in the presence of a small quantity of an alkaline catalyst for a period of approximately 15 minutes during which the formaldehyde is completely consumed with the production of phenol alcohols mainly corresponding in average composition to di-alcohols, leaving an approximately equimolecular quantity of free phenol and a little resin in solution. At this stage of operation the reaction mixture is highly-colored yellow, red or brown and, if the condensation were continued by heating according to the usual way, a highly colored product would be obtained. However, this aqueous solution of phenol alcohols is cooled and diluted with an excess of water, following which it is neutralized with dilute hydrochloric acid. The small quantity of resin already formed precipitates upon neutralization and carries down with it the coloring matter, leaving behind a substantially colorless solution of phenol alcohols and phenol, the percentage of the latter depending in some measure upon the relative proportions of phenol and formaldehyde originally employed. This last-named solution is then strongly acidified in the cold by a strong acid, whereupon there is precipitated the colorless resin heretofore described.

It is possible to obtain the same type of resinous product from the cold acid condensation regardless of the quantity or strength of acid employed, although the rapidity of conversion of the resin to the Bakelite B state varies directly with the strength or concentration of the acid. Furthermore the acidification is carried out in comparatively dilute solution and there is no violent reaction or undesirable heating effect.

It has been discovered that upon reacting equimolar proportions of phenol and formaldehyde at atmospheric temperature for a sufficient length of time—as for example, 1 day—the resultant product is not exclusively mono-alcohols, as appears to be indicated by the literature, but, instead, contains about ⅓ each of phenol, monoalcohols and polyalcohols. These various alcohols have somewhat different resinification characteristics as has previously been indicated. It is therefore within the scope of the present invention to separate the polyalcohols from such a reaction mixture and separately treat them or the mixture of monoalcohols and phenol with strong acids under the general conditions disclosed. Where substantial amounts of free phenol are present with the mono alcohol, soluble novalak type resins are produced. By reducing or eliminating the phenol either by the use of increased amount of formaldehyde or by steam distillation, the resultant product is in the case of phenol a white resinoid which if cured out of contact with air will yield a white Bakelite B type of resinoid which gradually darkens on standing.

It is recognized that resinous products heretofore have been obtained by acid condensation of phenol which appeared to resemble standard bakelite except that owing to the violence of the exothermic reaction they have been obtained in swollen or sponge-like form, yielding hardened and unworkable heterogeneous compositions contaminated with acid, aldehyde, etc. and discolored by red coloring matter. For the formation of a curable product, however, by the acid treatment of phenol direct, relatively large proportions of both formaldehyde and acid are required; and although the reaction may be tempered by using less acid, yet under these conditions, a similar proportion of aldehyde yields products of the novalak type. In the practice of the present invention, on the other hand, it is possible to so control the speed of the resinification reaction that substantially the same type of valuable resin is obtained, regardless of the quantity and strength of acid used for the condensation. Technically valuable Bakelite A type resins or resoles may thus be produced by simple acid condensation of the corresponding phenol alcohols without the use of modifying agents such as have been used in the past to control the degree of the condensation and the properties of the resin. The excess acid is very readily washed out of the plastic or powdery products made according to the present invention so that the same will be non-injurious to the molds while still retaining their desirable curing properties.

By the use of this invention it is possible to produce, from phenolic mixtures previously thought unsuited for the production of curable resins, by the employment of acid catalysts, synthetic resins of the bakelite type either in the Bakelite A or B stage as desired, and in forms making them especially suitable for use in rapid curing molding compositions. Specific applications of the process to mixtures of the higher tar acids obtained from low or high temperature coal tar or their equivalent, make possible the production in a novel manner from these tar acid mixtures, of curable resins of high purity, in a colorless or light-colored state, while simultaneously segregating therefrom other phenol formaldehyde resins having properties adapting them for use in coating compositions, and the like.

By the term "phenolic substance" and similar terms in the specifications and claims I refer not only to phenol, and cresol, xylenol and the like but also to phenolic homologues and derivatives having at least one hydroxyl group connected to the nucleus, and mixtures thereof, including the higher tar acids from coal tar and distillates thereof, including those boiling above 225° C.

The term "formaldehyde" as used in the claims, is intended to include formaldehyde-yielding compounds such as paraformaldehyde, hexamethylene tetramine, and the like.

The invention is susceptible of modification within the scope of the appended claims.

I claim:

1. The process for producing light-colored potentially reactive resins of the phenol-formaldehyde type which comprises reacting upon a phenolic substance with formaldehyde in the presence of an alkaline catalyst under conditions producing a major amount of a mixture of phenol alcohols and not more than minor amounts of resinous substances, neutralizing the resultant mixture thereby precipitating any resin incidentally formed in the previous step and separating it from the reaction mixture, strongly acidifying with a strong acid the residual liquor therefrom, thereby precipitating the said synthetic resin, and separating the last-named resin from the said liquor.

2. The process for producing potentially-reactive resins of the phenol formaldehyde type which comprises reacting with formaldehyde upon a phenolic substance in the presence of an alkaline catalyst under conditions producing a major portion of a phenol alcohol mixture and not more than a minor portion of resin, diluting the resultant reaction mixture with water, thereafter neutralizing the same for the precipitation therefrom of the resin formed, separating the said resin from the phenol alcohol solution, acidifying the latter with a strong acid at or near room temperature, thereby precipitating a potentially reactive light colored resin directly in the Bakelite B form, and separating this last-named resin from the residual liquor.

3. The process for the controlled production of potentially-reactive resins of the phenol-formaldehyde type directly in the Bakelite B state, which comprises reacting an alkaline solution of a phenolic substance and formaldehyde under conditions to produce an alkaline solution containing phenol alcohols without material resinification of the latter, neutralizing the said phenol alcohol solution, separating therefrom any precipitate formed, subsequently strongly acidifying in the cold the solution of the phenol alcohols, thereby producing the said potentially-reactive resins in the Bakelite B state and separating the said resin from the residual liquor.

4. The process for producing light-colored potentially-reactive resins of the phenol-formaldehyde type which comprises reacting with formaldehyde upon a phenolic substance normally containing color-producing compounds under conditions adapted to produce a major portion of a phenol alcohol mixture and a minor portion of a resin, precipitating the resin in the presence of the phenol alcohols, thereby concurrently removing from the latter the said color-producing compounds, separating the resin and color-producing compounds from the resultant colorless solution of phenol alcohols, subsequently reacting upon the latter with a strong acid at controlled temperatures not above 60° C., and recovering from the residual liquor the thus precipitated light-colored, potentially-reactive resins.

5. The process as defined in claim 4 in which the phenolic substance is technical cresol.

6. The process as defined in claim 4 in which the phenolic substance is a mixture of tar acids obtained from a low-temperature tar distillate having a boiling range above 210° C.

7. The process of producing potentially-reactive resins of the phenol-formaldehyde type which comprises dissolving in a solvent therefor a mixture containing water-insoluble phenol alcohols, diluting the mixture with water in amounts sufficient to fractionally precipitate from such mixture any resin present therein, separating the said resin from the solution of phenol alcohols, treating the latter with an excess of a strong acid at temperatures not higher than 60° C. thereby precipitating curable, light-colored resins, and separating the last-named resins from the residual liquor.

8. The process for producing a potentially-reactive, light-colored synthetic resin of the phenol-formaldehyde type adapted for use in a molding composition which comprises reacting a tar acid fraction from a tar distillate with more than a molar proportion of formaldehyde in the presence of an alkaline catalyst under conditions producing phenol alcohols while limiting the extent of resinification of the latter, neutralizing the resultant reaction mixture, separating the precipitate thus formed from the solution of water-soluble phenol alcohols, treating the latter at temperatures below 60° C. with an excess of a strong acid, thereby precipitating the said potentially-reactive resins, and separating the said resin from the reaction mixture.

FREDERIC S. GRANGER.